(12) United States Patent
Williams et al.

(10) Patent No.: US 9,355,014 B2
(45) Date of Patent: May 31, 2016

(54) DEBUG INSTRUCTION SET ALLOCATION ACCORDING TO PROCESSOR OPERATING STATE

(75) Inventors: Michael John Williams, Cambridgeshire (GB); Richard Roy Grisenthwaite, Cambridgeshire (GB); Simon John Craske, Cambridge (GB)

(73) Assignee: ARM Limited, Cambridge (GB)

(*) Notice: Subject to any disclaimer, the term of this patent is extended or adjusted under 35 U.S.C. 154(b) by 507 days.

(21) Appl. No.: 13/137,375

(22) Filed: Aug. 10, 2011

(65) Prior Publication Data

US 2012/0079254 A1 Mar. 29, 2012

(30) Foreign Application Priority Data

Sep. 24, 2010 (GB) .................................. 1016077.8

(51) Int. Cl.
*G06F 9/318* (2006.01)
*G06F 11/267* (2006.01)
*G06F 11/36* (2006.01)
*G06F 9/455* (2006.01)
*G06F 9/30* (2006.01)

(52) U.S. Cl.
CPC ........ *G06F 11/3648* (2013.01); *G06F 9/30189* (2013.01); *G06F 9/45554* (2013.01)

(58) Field of Classification Search
CPC ............ G06F 9/30189; G06F 9/45554; G06F 11/3648
USPC ................................................. 712/227, 229
See application file for complete search history.

(56) References Cited

U.S. PATENT DOCUMENTS

| | | | |
|---|---|---|---|
| 5,621,886 A * | 4/1997 | Alpert et al. | 714/38.13 |
| 6,802,017 B1 * | 10/2004 | Takayama et al. | 713/324 |
| 7,134,116 B1 | 11/2006 | Thekkath et al. | |
| 8,769,495 B1 * | 7/2014 | Gupta | 717/124 |
| 2006/0048099 A1 * | 3/2006 | Templin et al. | 717/124 |
| 2007/0180333 A1 | 8/2007 | Thekkath et al. | |
| 2008/0040587 A1 | 2/2008 | Burke et al. | |
| 2008/0046701 A1 * | 2/2008 | Kershaw et al. | 712/228 |
| 2008/0086726 A1 | 4/2008 | Griffith et al. | |

(Continued)

FOREIGN PATENT DOCUMENTS

| | | |
|---|---|---|
| JP | 2008-97602 | 4/2008 |
| WO | 2012/038710 | 3/2012 |

OTHER PUBLICATIONS

Wikipedia.org, "64-bit computing", Aug. 11, 2009, downloaded from "http://en.wikipedia.org/w/index.php?title=64-bit_computing &oldid=307359248" on Feb. 3, 2014. 10 pages.*

(Continued)

*Primary Examiner* — Andrew Caldwell
*Assistant Examiner* — Yuqing Xiao
(74) *Attorney, Agent, or Firm* — Nixon & Vanderhye P.C.

(57) ABSTRACT

A data processing apparatus is provided comprising data processing circuitry and debug circuitry. The debug circuitry controls operation of the processing circuitry when operating in a debug mode. The data processing circuitry determines upon entry into a debug mode a current operating state of the data processing apparatus. The data processing circuitry allocates one of a plurality of instruction sets to be used as a debug instruction set depending upon the determined current operating state.

34 Claims, 7 Drawing Sheets

(56) References Cited

U.S. PATENT DOCUMENTS

2008/0216073 A1* 9/2008 Yates et al. .................. 718/100
2008/0270107 A1 10/2008 George et al.

OTHER PUBLICATIONS

"ARM® Architecture Reference Manual", Apr. 2008, ARM Limited, ARM® v7-A and ARM® v7-R edition, p. C5-13.*
International Search Report mailed Sep. 22, 2011 in PCT/GB2011/051410.
"MIPS architecture" Wikipedia, Sep. 2010, http://en.wikipedia.org pp. 1-12.
MIPS Technologies Inc. "MIPS32 4Kc™ Processor Core Datasheet" Rev. 01.03, Jun. 2000, pp. 1-30.
MIPS Technologies Inc. "MIPS64™ 5Kc™ Processor Core Datasheet" Rev. 02.23 Nov. 2001, pp. 1-44.
Power.org, "Power.org™ Target Debug Capabilities Specification" Version 1.0, May 2008, pp. 1-18.
International Preliminary Report on Patentability mailed Nov. 29, 2012 in PCT/GB2011/051410.
ARM7TDMI-S Technical Reference Manual, Revision r4p3, Sep. 2001, 242 pages.
ARN1176JZ-S Technical Reference Manual, Revision r0p7, Jul. 2004, 128 pages.
Search Report for UK 1016077.8, dated Jan. 7, 2011.
Search Report for UK 1016077.8, dated Jun. 14, 2011.
Edwards et al., "Debugging the SH-5 microcontroller", *Embedded System Engineering,* Sep. 2000, 5 pages.
English translation of Japanese Office Action dated Jun. 2, 2014 in JP 2013-529705, 4 pages.
English translation of Chinese Office Action dated Dec. 31, 2014 in CN 201180045900.2, 19 pages.
English translation of Japanese Office Action dated Feb. 9, 2015 in JP 2013-529705, 2 pages.
Malaysian Office Action dated Jan. 29, 2016 issued in ML PI2013700228, 3 pages.
Malaysian Office Action dated Jan. 29, 2016 issued in ML PI2013700228, 3 pages.
Chinese Third Office Action dated Mar. 4, 2016 issued in CN 201180045900.2 and English translation, 7 pages.

* cited by examiner

| PL[9:8] | privilege level |
|---|---|
| 00 | PL0 |
| 01 | PL1 |
| 10 | PL2 |
| 11 | PL3 |

FIG. 4B

| RW[13:10] | processor state for each privilege level |
|---|---|
| 1111 | PL0-PL3 all AArch 64 processor state |
| 1110 | PL0 AArch 32 state<br>PL1-PL3 AArch 64 state |
| 1100 | PL0-PL1 AArch 32 state<br>PL2-PL3 AArch 64 state<br>(never seen if EL2 not present<br>in current security state) |
| 1000 | PL0-PL2 AArch 32 state<br>PL3 AArch 64 state<br>No PL2 in secure state<br>PL0-PL1 in AArch 32 |
| 0000 | PL0-PL3 all AArch 32 |

FIG. 4C

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | | | | | | RW | | | PL | | | | | | | | | |

FIG. 4A

DEBUG INSTRUCTION SET ALLOCATION ACCORDING TO PROCESSOR OPERATING STATE

This application claims priority to UK Patent Application No. 1016077.8 filed 24, Sep. 2010, the entire contents of which is hereby incorporated by reference.

BACKGROUND OF THE INVENTION

1. Field of the Invention

The present invention relates to data processing. More particularly, the present invention relates to debugging of a data processing apparatus.

2. Description of the Prior Art

Debugging of a data processing apparatus is a methodical process of finding and reducing the number of bugs or defects in either a computer program running on the data processing apparatus or a piece of electronic hardware comprising the data processing apparatus. As they have developed over time, microprocessors and the software designed to run on them have become more complex so the process of debugging has become progressively more challenging in terms of devising efficient methods and systems to detect defects in operation. It is known to provide a debug mode of a data processing apparatus into which the data processing apparatus is switched in order to execute debug operations.

With the complexity of modern microprocessors, it is now not unusual for a given microprocessor to be capable of executing more than one instruction set. For example the ARM7TDMI® processor core is capable of executing both a regular "A32" instruction set (also known as the "ARM" instruction set) comprising 32-bit wide operation codes, and a more compact instruction set denoted "T32" (also known as the "Thumb" instruction set) that provides a subset of the most commonly used A32 instructions that have been compressed into 16-bit wide operation codes. On execution, the 16-bit wide instructions can be either decompressed to the full 32-bit wide A32 instructions or executed directly using a dedicated decoding unit. Thus a given data processing apparatus can be capable of executing a plurality of different instruction sets. Both the A32 instruction set and the T32 instruction set operate on 32-bit wide data.

In addition to a given data processing apparatus being capable of executing a plurality of different instruction sets, many modern data processing apparatuses are capable of operating in a plurality of different operating states or at a plurality of different "privilege levels". At different privilege levels, the data processing apparatus imposes on program instructions different access permissions to at least one of memory and a set of registers. For example, the set of control registers accessible to the processing circuitry at a standard privilege level will typically be more restricted than the set of control registers accessible to the data processing apparatus when operating at a higher privilege level, e.g. when a data processing apparatus is operating in a system mode rather than a user mode. When operating at different privilege levels the data processing apparatus will typically apply different virtual to physical memory address translation schemes for translating memory addresses of program instructions.

For example, in data processing systems that implement virtualisation and run a hypervisor to enable a plurality of different guest operating systems to be run on the same data processing apparatus, any privilege level of the data processing apparatus that sits below the privilege level of the hypervisor (i.e. runs under supervision of the hypervisor) will have an additional level of address translation associated with the virtualisation process. The additional level of address translation makes use of a "virtual translation table base register". However, the privilege level corresponding to the hypervisor layer itself does not require reference to a virtual translation table base register but only to a translation table base register and thus will involve one fewer translation stage.

It is known in processors that are capable of executing a plurality of instruction sets to impose a default debug instruction set for use when the data processing apparatus is in a debug mode. For example, in the ARM10, ARM11 and ARM Cortex processors the default was to use the A32 instruction set whenever the data processing apparatus switched into a debug mode. An alternative known approach used, for example in ARM7TDMI® and ARM9 processors is that upon entry to the debug mode the instruction set state remains as it was on entry to the debug mode so that if the data processing apparatus was executing T32 instructions upon entry to the debug mode then T32 instructions would be used for the debug process whereas if the data processing apparatus was executing A32 instructions upon entry to the debug mode then the debug process would be executed using A32 instructions.

However, problems can arise due to the possible mismatch between the operating state of the data processing apparatus i.e. the privilege level at which the data processing apparatus is operating when debug operations are to be performed and the instruction set allocated for use in the debug mode of the data processing apparatus. Thus, for example, the virtual to physical address translation scheme appropriate for the current privilege level of the processor could be incompatible with the chosen debug instruction set. This can present a particular problem in a data processing apparatus configurable to have a variable-width register for instructions because instructions having a larger operand bit-width could have to be used for a debug process whereas the operating state of the processor may mean that a 32-bit virtual to physical address translation scheme should be implemented in the debug mode. This potential mis-match between the processor operating state and the debug instruction set increases the complexity of the debug operations because the debug module hardware will then have to be designed to accommodate a large number of bit patterns corresponding to each of the plurality of instruction sets that can be executed by the data processing apparatus. Thus there is a requirement to reduce the complexity of the debug circuitry yet still offer the flexibility to debug a data processing apparatus capable of operating at a plurality of different privilege levels and/or capable of executing a plurality of different instruction sets.

SUMMARY OF THE INVENTION

According to a first aspect the present invention provides a data processing apparatus comprising:

data processing circuitry for performing data processing operations in response to execution of program instructions, said data processing circuitry being configured to operate in at least an operational mode and a debug mode;

debug circuitry configured to provide an interface between said data processing circuitry and a debugger unit external to said data processing circuitry, said debug circuitry being configured to control operation of said data processing circuitry when said data processing apparatus is operating in said debug mode;

wherein said data processing circuitry is configured to determine, upon entry of said data processing circuitry into said debug mode, a current operating state of said data processing circuitry and to allocate, depending upon said current operating state, one of a plurality of instruction sets to be used as a debug instruction set.

The present invention recognises that by determining upon entry of the data processing circuitry into the debug mode the current operating state of the data processing apparatus and allocating, depending upon the current operating state, one of the plurality of instruction sets to be used as a debug instruction set, a good level of flexibility is afforded. This is because it provides the opportunity to use more than a single default instruction set in a debug mode, yet to appropriately select the chosen instruction set depending upon the current operating state of the data processing apparatus. This improves the likelihood of the compatibility between the current operating state of the data processing circuitry and the allocated debug instruction set.

By not simply choosing the current instruction set upon entry to the debug mode, the total number of instructions that needs to be supported in the debug mode can be reduced. In fact, only a subset of the full plurality of instruction sets capable of execution by the data processing apparatus need be implemented in the debug mode. This simplifies validation of the debug instructions and reduces the cost of the debugging circuitry. Effectively, enabling allocation of one of a plurality of instruction sets depending upon the current operating state of the data processing circuitry upon entering debug mode ensures that the instructions being decoded in the debug mode are appropriate to the memory configuration (i.e. privilege level) of the current operating state.

It will be appreciated that the data processing apparatus could be configured to operate in any one of a number of different operating states involving different views of the data processing hardware and that an appropriate debug instruction set could be allocated according to the particular properties of the current operating state. However, in some embodiments the data processing circuitry is configurable to operate at a plurality of privilege levels, wherein at different privilege levels, the data processing circuitry imposes on program instructions different access permissions to at least one of a memory and a set of registers. For example, at a higher privilege level, the data processing apparatus could have access to a larger set of control registers than at a lower privilege level. The different views of memory and/or registers applicable to different privilege levels makes compatibility between the debug instruction set and the current operating state of the processor more important. The ability to allocate the debug instruction set from a plurality of alternative debug instruction sets depending upon the current privilege levels improves the efficiency of the debug operation.

It will be appreciated that at different privilege levels the data processing apparatus could have various differences in operating state, apart from the difference in access permissions to at least one of memories and registers. However, in one embodiment, at different ones of the privilege levels, the data processing circuitry applies respectively different virtual memory address to physical memory address translation rules. Where different virtual to physical address translation rules are used by the data processing apparatus in different operating states, the debug operation could become unduly complex if an inappropriate debug instruction set is allocated in debug mode. For example, a problem could arise where the current operating state is a guest operating system configured to translate 32-bit virtual addresses into physical addresses whereas the default debug instruction set comprises instructions that generate 64-bit virtual addresses. This would either require 32-bit virtual addresses to be generated from the 64-bit debug instructions, or a means to translate 64-bit virtual addresses in a system configured to translate 32-bit virtual addresses. Thus; the ability to appropriately allocate a debug instruction set depending upon a current operating state of the processor is useful for avoiding incompatibility between a currently implemented virtual to physical memory address translation scheme and instructions to be executed for debug operations.

In some embodiments, the data processing apparatus is configured to execute program instructions corresponding to a plurality of different software hierarchical levels corresponding to a respective plurality of privilege levels. Thus, for example, one privilege level may correspond to a guest operating system whereas another privilege level may correspond to a user application. Problems can arise due to the general requirement for a data processing apparatus to be backwards compatible in terms of software, such as a requirement, to be able to execute a 32-bit operating system on a data processing apparatus inherently capable of executing 64-bit instructions. The ability to allocate an appropriate debug instruction set depending upon a current operating state and accordingly a current software hierarchical level provides flexibility within the debug system to adequately cope with debugging in a system that incorporates backwards compatibility.

It will be appreciated that the plurality of privilege levels corresponding to the different software hierarchical levels could comprise many and varied different combinations of software layers. However, in one embodiment, the plurality of software hierarchical layers comprises a hypervisor layer in addition to an application layer and an operating system layer. This enables the system to conveniently cope with virtualisation.

In a further embodiment in addition to the application system layer and the operating system layer and either with or without the hypervisor layer, a security-monitoring layer is provided. Ensuring that an appropriate debug instruction set is selected when operating in a secure mode is particularly important to preserve the integrity of the data processing apparatus.

It will be appreciated that upon initial entry to the debug mode a single debug instruction set could be allocated depending upon the current operating state upon entry to the debug mode. However, in some embodiments, the data processing apparatus is configurable from within the debug mode itself to switch between different ones of the plurality of privilege levels and the data processing circuitry is configured to repeat the determination of the current operating state of the determination and repeat allocation of the debug instruction set depending upon the newly switched operating state of the data processing apparatus. This ensures that, despite switches in the current operating state whilst debug operations are being performed, an appropriate debug instruction set is still allocated. This provides the additional flexibility to enable the debug circuitry to be controlled to switch from one operating state to a different operating state in order to further investigate a prospective system bug and ensures that, despite this flexibility, compatibility between the debug instruction set and the current operating state is maintained.

It will be appreciated that the current operating state of the data processing apparatus could be selected from a plurality of different processor operating states having identical operand bit-widths. However, in one embodiment, the current operating state is selected from a plurality of different processor operating states having respective different operand bit-widths. In a data processing apparatus capable of executing instructions having different operand bit-Widths, compatibility problems are likely to arise, for example, due to virtual to physical address translation schemes differing between the two different operand bit-widths etc. Thus the ability to appropriately allocate a debug instruction set according to the current operating state is useful in avoiding having to implement unduly cumbersome conversion processes when in a debug mode. In some such embodiments the plurality of operating states having operand bit-widths comprises at least a 32-bit operating state and a 64-bit operating state.

It will be appreciated that the present technique could be applied to any data processing apparatus such as a data processing apparatus that executes instructions by reading operands from memory. However, in some embodiments the data processing apparatus comprises a plurality of registers for storing operands of the program instructions and wherein the different operand bit-widths correspond to different register widths used by the processing circuitry. In such a data processing apparatus that is configurable to use variable register widths, it is useful to be able to allocate an appropriate debug instruction set depending on the current operating state since the allocation of the debug instruction set can be appropriately chosen depending upon the current set up of the variable-width registers. In some such embodiments at least a subset of the plurality of registers having different operand bit-widths are configured as variable width-registers.

In some embodiments, the data processing circuitry is configured to indicate the debug instruction set that has been allocated depending upon the current operating state to the debug circuitry by writing to at least one register accessible to the debug circuitry. This provides a convenient way of indicating the appropriate debug instruction set for use by the debug circuitry. In alternative embodiments the data processing circuitry is configured to indicate the debug instruction set to the debugger unit by sending a control command to the debugger unit. This saves on register space.

It will be appreciated that the data processing apparatus could determine the current operating state in any one of a number of different ways. However, in some embodiments, the data processing apparatus is configured to maintain a stored value of the current operating state in a given location accessible to the debugger unit. This is straightforward to implement and allows for easy access by the debugger unit to the current operating state whenever it is required regardless of when the data processor switches from a non-debug mode into the debug mode.

In some embodiments, where the data processing apparatus is configurable to operate at a plurality of different privilege levels, the current operating state is selected from a plurality of processor operating states having respective operand bit-widths and the data processing apparatus is configured to maintain a record of an operand bit-width associated with each of the plurality of privilege levels in a first location accessible to the debug circuitry. The operand bit-widths of the different processor operating states are not necessarily all different, for example, with four privilege levels and two bit-widths the same operand bit-width can be used for two or more privilege levels. This provides a convenient means of storing for each possible privilege level an associated operand bit-width, which means that the appropriate debug instruction set can be readily determined. It should be noted that the operand bit-width currently stored in the maintained record will depend upon the current time, since it will be appreciated that at different times the data processing apparatus may be executing, for example, a different program operation or a different guest operating system and accordingly the operand bit-width associated with a given privilege level may be different at different times.

In some such embodiments in which the record of the operand bit-width associated with each of the plurality of privilege levels is stored in a first location, the data processing apparatus is also configured to maintain a record of the current privilege level at which the data processing circuitry is operating in a second location accessible to the debugger unit. By reference to both the first location and the second location, the debugger unit can readily determine an operand bit-width corresponding to the current privilege level and accordingly can appropriately determine the debug instruction set that the data processing circuitry has allocated depending upon the current operand bit-width.

In some embodiments the data processing circuitry uses said current privilege level to determine from said plurality of processor operating states having said respective operand bit-widths said debug instruction set. In some such embodiments the data processing apparatus is configured to maintain a record of a current operand bit-width corresponding to a current processor operating state.

In alternative embodiments the debugger unit is configured to use said record of said current operand bit width to deduce the debug instruction set and to cause at least one program instruction to be executed by the data processing circuitry to determine a current privilege level at which the data processing circuitry is operating. This is cheaper to implement since it uses less register space than providing a storage location for an operand bit-width for each of the plurality of possible privilege levels. The fact that less register space is used offsets the additional cost in terms of the logic required to determine the current exception level. Although the debugger unit deduces the debug instruction set in this case, the data processing circuitry makes the initial determination of the appropriate debug instruction set (i.e. actually allocates the debug instruction set) and the debugger unit then works out what the data processing circuitry did based on the register contents.

On the other hand, in the embodiments that use both the record of the current privilege level and the record of the operand bit-width associated with at least a plurality of privilege levels the state of these two sets of storage locations is likely to conveniently mirror the state of, for example, registers elsewhere in the processor and provides more information to the debugger and reduces the number of program instructions to be executed in order to determine the appropriate debug instruction set.

It will be appreciated that the allocated debug instruction set could comprise a full instruction set available for execution by the data processing apparatus in a non-debug mode. However, in some embodiments, the allocated debug instruction set comprises a subset of a full instruction set. In some such embodiments the subset is a subset of one of: an A32 instruction set; a T32 instruction set; a T32EE instruction set; and an A64 instruction set. Thus, those instructions of the full instruction set that would be undesirable and/or not useful to implement in a debug mode can be readily excluded from the subset of full instructions allocated for use in the debug mode. For example branch instructions of a given full instruction set can be forced to be undefined when in a debug mode.

According to a second aspect the present invention provides a data processing method comprising:

performing data processing operations in response to execution of program instructions on data processing circuitry being configured to operate in at least an operational mode and a debug mode;

providing a debug interface between said data processing circuitry and a debugger unit external to said data processing circuitry, said debug interface being configured to control operation of said data processing circuitry when said data processing circuitry is operating in said debug mode;

determining, upon entry of said data processing circuitry into said debug mode, a current operating state of said data processing circuitry and allocating, depending upon said current operating state, one of a plurality of instruction sets to be used as a debug instruction set.

According to a third aspect the present invention provides a data processing apparatus comprising:

means for performing data processing operations in response to execution of program instructions, said means for performing data processing operations being configured to operate in at least an operational mode and a debug mode;

means for debugging configured to provide an interface between said means for performing data processing and a means for debug analysis external to said data processing apparatus, said means for debugging being configured to control operation of said means for performing data processing when said means for performing data processing is operating in said debug mode;

wherein said means for performing data processing is configured to determine, upon entry of said means for performing data processing into said debug mode, a current operating state of said means for performing data processing and to allocate, depending upon said current operating state, one of a plurality of instruction sets to be used as a debug instruction set.

Various respective aspects and features of the invention are defined in the appended claims. Combinations of features from the dependent claims may be combined with features of the independent claims as appropriate and not merely explicitly as set out in the claims.

BRIEF DESCRIPTION OF THE DRAWINGS

FIG. 4A schematically illustrates a subset of bit allocations in the external debug interface register (EDIFR) of FIG. 1;

FIG. 4B schematically illustrates bit patterns and respective privilege levels for the privilege level indicator bits of the EDIFR of FIG. 1;

FIG. 4C schematically illustrates for each of a plurality of register width bit-patterns the corresponding processor state for each of the four privilege levels;

DESCRIPTION OF EMBODIMENTS

Figure 1:
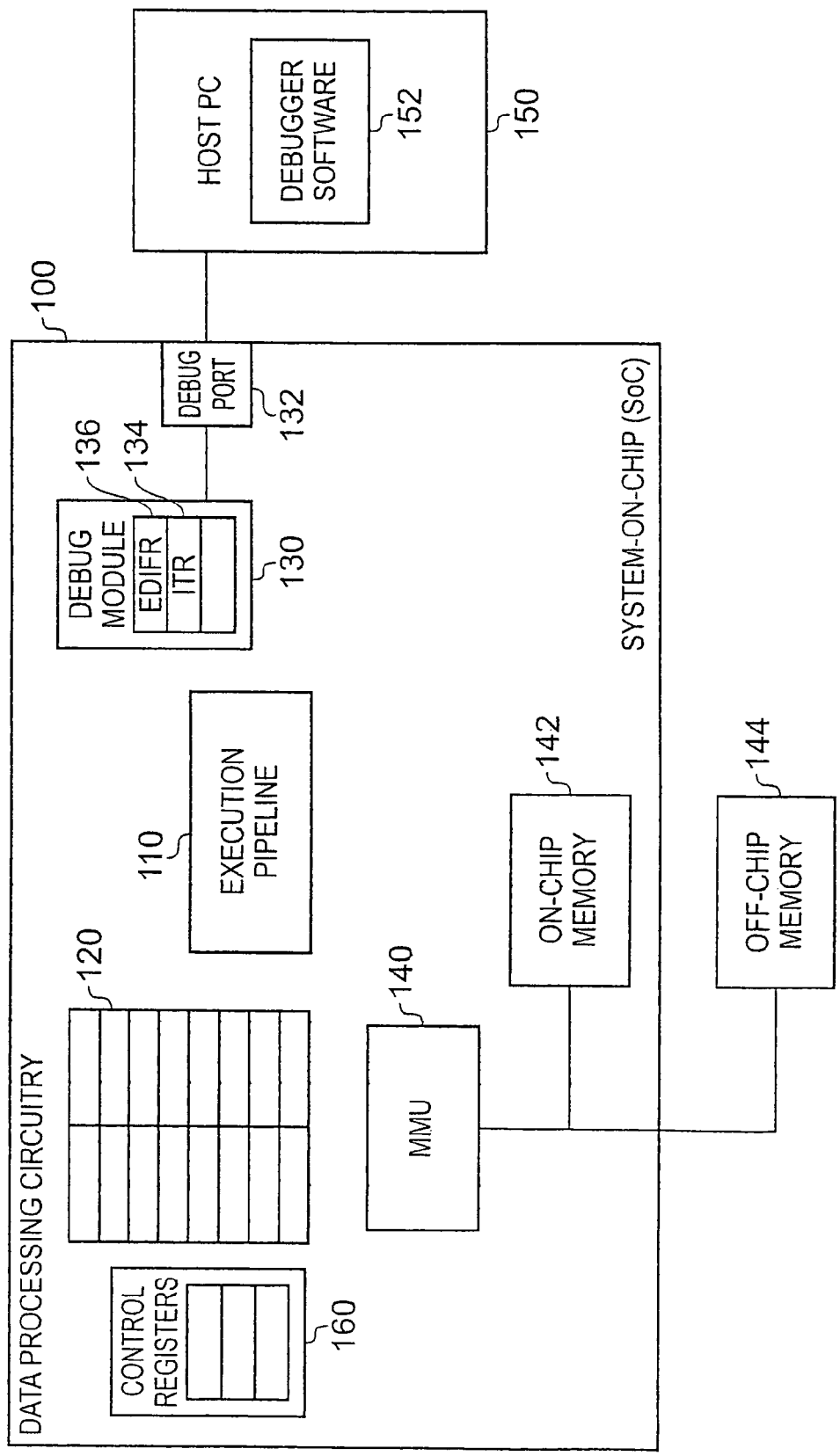
FIG. 1 schematically illustrates a data processing apparatus according to a first embodiment of the present invention, in which the processor implements a variable register-width and a debug module is provided comprising an external debug interface register.

FIG. 1 schematically illustrates a data processing apparatus according to an embodiment of the present invention. The data processing apparatus comprises an integrated circuit 100 comprising a plurality of circuitry components forming a "System-on-Chip". The integrated circuit 100 comprises: an execution pipeline 110, a set of general purpose registers 120, a set of control registers 160, a debug module 130, a debug port 132, a memory management unit (MMU) and an on-chip memory 142. The data processing apparatus 100 also has access to off-chip memory 144. The debug port 132 of the data processing apparatus 100 is connected to a host personal computer 150 configured to run a set of debugger software 152 to assist in debugging the data processing circuitry 100.

The data processing apparatus 100 of FIG. 1 has a RISC (Reduced Instruction Set Computing) architecture, which is a load-store architecture in which instructions that process data operate only on registers and are separate from instructions that access memory. The data processing apparatus 100 is a pipelined data processing apparatus and the execution pipeline 110 comprises a fetch stage, a decode stage and a execute stage (not shown). The set of registers comprises general purpose registers 120 as well as control registers 160. In this particular embodiment, the set of registers 120 comprises a plurality of 64-bits registers, which are configurable to operate as variable-width registers such that when the data processing circuitry 100 is operating in a 32-bit register width operating state, i.e. when executing a program that substantially processes 32-bit data and uses 32 bits of virtual address (referred to as a 32-bit program, comprising 32-bit program instructions), the set of registers 120 are viewed by the data processing apparatus as 32-bit registers, whereas when the data processing apparatus 100 is operating in a 64-bit register width operating state, i.e. when executing a program that substantially processes 64-bit data and uses more than 32 bits of virtual address (referred to as 64-bit program, comprising 64-bit program instructions), it is configured such that the full 64-bit width of each register of the set of registers is 120 is utilised. However, note that when the processing circuitry 100 is operating in a 32-bit register width operating state some 64-bit operations (e.g. wide multiplies and load/store of a 64 bit value) can still be performed. Similarly, when the processing circuitry 100 is operating in a 64-bit register width operating state some 32-bit operations may still be performed.

When in a non-debug mode of operation, the data processing circuitry 100 fetches instructions for execution from system memory i.e. from either on-chip memory 142 or off-chip memory 144. The memory management unit 140 controls access to the memory 142, 144 according to the current operating state of the data processing apparatus 100 such that, for example, in a user mode a smaller subset of memory locations are accessible to the data processing circuitry 100 than are accessible in a system mode.

The memory management unit 140 is responsible for handling all access requests to memory by the execution pipeline 110 and its functions include translation of virtual memory addresses to physical memory addresses, memory protection, cache control and bus arbitration. When the data processing apparatus 100 enters a debug mode, the execution pipeline fetches instructions directly from an instruction transfer register (ITR) 134 of the debug module 130. The instruction transfer register 134 is loaded with debug instructions under control of the debugger software 152 executing on the host PC 150, which in the debug mode controls the data processing circuitry 100 via the debug port 132. In this embodiment the debugger software 152 and the host PC 150 that it runs on represents the debugger unit. However, in alternative embodiments, the debugger unit is fabricated on the same integrated circuit as the data processing circuitry.

The control registers 160 store control values responsible for controlling aspects of the data processing apparatus 100. In particular, they store, for each of a plurality of "privilege levels" of the data processing apparatus 100 (described in detail with reference to FIG. 2) a corresponding operand bit-width operating state associated with that privilege level.

The debug module 130 further comprises an external debug interface register (EDIFR) 136 that maintains a record of the register width state (i.e. operand bit-width state) associated with each of the plurality of privilege levels and a record of the current privilege level at which the data processing apparatus 100 is operating. The EDIFR 136 is visible to the debugger software 152.

When the data processing apparatus 100 switches from a standard operational mode (or any non-debug mode) into a debug mode, the data processing apparatus 100 determines from data stored in the control registers 160, the current operating state of the data processing apparatus and depending upon this state selects one of the plurality of different debug instruction sets to be implemented for performing debug operations, and updates the record in the EDIFR 136 accordingly. It is possible for the debugger software 152 to initiate a switch of the data processing apparatus 100 from one operating state to another different operating state whilst in the debug mode. For example, the data processing apparatus can be switched from operating at a first privilege level to execute a first group of debug instructions to operating at a second different privilege level to execute a second group of debug instructions. Accordingly, the debug module 130 is configured to repeat determination of the current operating state of the data processing circuitry 100 based on information in the control registers 160 at the time of the operating-state switch and to allocate an updated debug instruction set for the debug operations, and update the record in the EDIFR 136 accordingly. In this case the debug instruction set implemented may change corresponding to the operating state switch or alternatively could remain the same.

Although in the embodiment of FIG. 1, the EDIFR 136 is located within the debug module 130, in alternative embodiments EDIFR 136 is located in the host personal computer 150 external to the data processing apparatus 100 i.e. in the debugger unit. In yet further alternative embodiments the EDIFR is not implemented, but the information contained therein is obtained by the debugger unit by reading the state values from the main system registers i.e. control registers 160. At a hardware level, the EDIFR registers 136 can be implemented as latch circuits (as in the FIG. 1 embodiment) or as simple combinatorial paths from the system registers. Furthermore, although in the embodiment of FIG. 1 the host PC (the debugger unit) is situated off-chip relative to the data processing circuitry 100, in alternative embodiments the data processing apparatus 100 and circuitry for controlling debug operations and executing the debugger software 152 (i.e. the debug unit) are fabricated on the same integrated circuit, so that the data processing circuitry 100 does not form the entire System-on-Chip. In such embodiments, logically the debug circuitry can be viewed as part of a processor being debugged and the debug unit is a second, different processor located on the same System-on-Chip. In the embodiment of FIG. 1, the debug circuitry of the debug module 130, which provides an interface (e.g. and Advanced Microcontroller Bus Architecture bus interface) to the debugger unit 150 is part of the same "macrocell" as the data processing circuitry of the System-on-chip 100.

Figure 2:
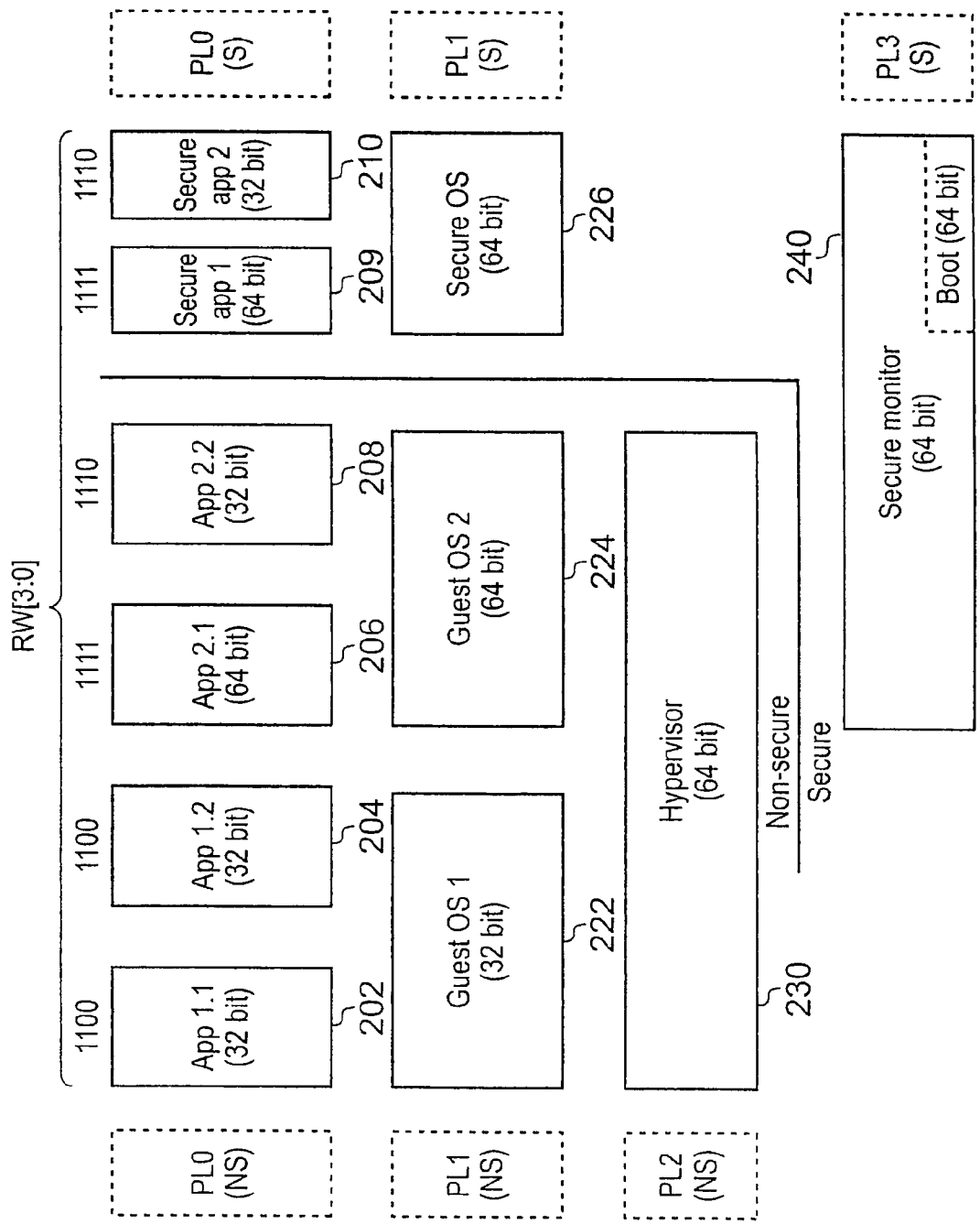
FIG. 2 schematically illustrates a plurality of different operating states of the data processing apparatus of FIG. 1 and how those operating states correspond to a plurality of different privilege levels and a respective plurality of software hierarchical levels.

FIG. 2 schematically illustrates a plurality of different operating states of the data processing apparatus 100 of FIG. 1 corresponding to a respective plurality of different privilege levels. Respective privilege levels correspond to respective different hierarchical layers of software executing on the data processing apparatus 100 of FIG. 1. The uppermost row of FIG. 2 corresponds to the lowest privileged level PL0 whereas the lowermost row of FIG. 2 corresponds to the highest privilege level PL3. Between the lowest privilege level PL0 and the highest privilege level PL3 there are two intermediate privilege levels PL1 and PL2.

The lowermost privilege level PL0 corresponds to an application software layer. In this example embodiment, six different application programs are executing on the data processing apparatus 100 by time division multiplexing of the processing resources such that at any one instant in time only one of the six applications programs has control of the data processing circuitry 100.

A first program application 202 is a 32-bit program comprising 32-bit program instructions and thus when executing this first application 202, the data processing apparatus 100 is in a 32-bit operating state. A second program application 204 is also a 32-bit program application whose execution requires a 32-bit processor operating state. A third program application 206 is a 64-bit program comprising 64-bit program instructions and thus when executing this application, the data processing apparatus is put into a 64-bit operating state. A fourth program application 208 is a 32-bit program application requiring a 32-bit processor operating state. The lowermost privilege level PL0 also comprises a first secure 64-bit program application 209 and a second secure 32-bit program application 210. These secure applications can only be executed when the data processing apparatus is a secure mode of operation.

The first privilege level PL1 (second lowest privilege level) corresponds to an operating system software layer. In the embodiment of FIG. 1 and FIG. 2, the data processing apparatus is set up with a capability of hosting three different guest operating systems. A first guest operating system 222, is a 32-bit operating system, meaning it comprises a 32-bit program with 32-bit virtual addresses. A second guest operating system 224, is a 64-bit operating system, meaning it comprises a 64-bit program with more than 32 bits of virtual address. A 64-bit secure operating system 226 also sits at the first privilege level PL1 for exclusive use in the secure mode of processor operation.

An operating system is responsible for the management of applications, in particular controlling the access of applications to the underlying data processing system 100 and for time division multiplexing between different applications, including, in multiprocessor and multithreaded processors, the allocation of application programs to different processors and threads. In the embodiment of FIG. 1 and FIG. 2, a 32-bit operating system can only manage 32-bit program applications, and hence the two applications managed by the first guest operating system 222, that is, the first program application 202 and the second program application 204, are both 32-bit program applications. However, a 64-bit operating system is capable of managing both 64-bit and 32-bit program applications, and hence the applications managed by the second guest operating system 224 and by the secure operating system 226 comprise a mix of 32-bit program applications and 64-bit program applications. The operating systems, 222, 224 and 226, are responsible for controlling a pair of Translation Table Base Registers (TTBR0_PL1 and TTBR1_PL1) which influence how virtual to physical memory address translation is performed for each of the applications executing at privilege level PL0 and for the operating system itself executing at privilege level PL1.

The second privilege level PL2, corresponds to a hypervisor software layer. In FIG. 2 the hypervisor 230 is a 64-bit program comprising 64-bit program instructions that executes on the data processing apparatus 100 and enables the first guest operating system 222, the second guest operating system 224 to be executed on the same data processing apparatus 100. The hypervisor 230 is part of a virtualisation system which enables the first guest operating system 222 and second guest operating system 224 to run on the same data processing apparatus 100 without having any knowledge that the other guest operating system is concurrently executing there.

The hypervisor is responsible for managing the operating systems, in particular controlling the access of operating systems to the underlying data processing system 100 and for time division multiplexing between different operating systems, including, in multiprocessor and multithreaded processors, the allocation of operating systems to different processors and threads. A 64-bit hypervisor is capable of managing both 32-bit and 64-bit operating systems, and hence the operating systems managed by hypervisor 230 comprise a mix of 32-bit and 64-bit operating systems. The hypervisor 230 controls implementation of a Virtual Translation Table Base Register (VTTBR_PL2) which further influences how virtual to physical memory address translation is performed for each of the operating systems executing at privilege level PL1, and for the applications managed by those operating systems executing at privilege level PL0. The hypervisor 230 also controls implementation of a third Translation Table Base Register (TTBR_PL2) which controls how virtual to physical memory address translation is performed for the hypervisor executing at privilege level PL2. Virtual to physical address translation at PL2 is therefore independent of virtual to physical address translation at PL0 and PL1.

The highest privilege level is PL3 and this corresponds to a secure monitor 240 software layer, which in this case is a 64-bit program comprising 64-bit program instructions. The secure monitor 240 operates as a gatekeeper between software executing in the non-secure mode, that is, the hypervisor 230, operating systems 222, 224, and the applications, 202, 204, 206 and 208, and software executing in the secure mode, that is the secure operating system 226 and the pair of secure applications 209, 210. As shown in FIG. 2, when the data processing apparatus is in a secure mode, the hypervisor 230 is not utilised. Thus in the secure mode there are effectively only three privilege levels: PL0, PL1 and PL3. The secure monitor 240 also controls implementation of a fourth Translation Table Base Register (TTBR_PL3) which controls how virtual to physical memory address translation is performed for the secure monitor executing at privilege level PL3. Virtual to physical address translation at PL3 is therefore independent of virtual to physical address translation at PL0, PL1 and PL2.

For a data processing apparatus 100 comprising a single execution pipeline 110 capable only of single-threaded operation, at any one point in time only a single program application will be running under control a single operating system, in either secure or non-secure mode. For each of the four privilege levels illustrated FIG. 2, the EDIFR 136 of the debug module 130 of FIG. 1 stores a corresponding operand bit-width. In this embodiment since there are four possible privilege levels, a field RW [3:0], i.e. a 4-bit field of the 32-bit EDIFR register 136, is used to provide an indication of the operand bit-width (or equivalently register width) corresponding to each exception level.

The contents of the field RW[3:0] for each of the possible operating states of the data processing apparatus is shown at the top of FIG. 2. When the first program application 202 is executing on the first guest operating system 222 under control of the hypervisor 230 and in a system having the secure monitor 240, the 4-bit register field RW[3:0] has the value of "1100". This is because in this embodiment, a value of "1" is used to indicate a 64-bit processor state where as a value of "0" is used to indicate a 32-bit processor architecture state. The four bits of the RW register field correspond respectively to PL3, PL2, PL1 and PL0. Similarly when the second program application 204 is executing on the first guest operating system 222 on top of the hypervisor 230 and the secure monitor 240, the four bit register field RW [3:0] has the value of "1100". On the other hand, when the third program application 206 (which is a 64-bit application) is executing on the 64-bit second guest operating system 224, the register field RW [3:0] has a value of "1111" because the application, the operating system the hypervisor and the secure monitor all correspond to 64-bit program code. When the fourth program application 208 is executing on the second guest operating system the 4-bit register field RW [3:0] has a value of "1110" because all except the lowermost privilege level (i.e. the fourth program application 208) correspond to 64-bit code.

When the data processing apparatus is operating in a secure mode there are only three rather than four privilege levels because the hypervisor layer 230 corresponding to PL2 is absent. Thus the choice of value for RW [2] is somewhat arbitrary. In the data processing apparatus of FIG. 1, RW [2] is set to the same value as RW [1] when operating in a secure mode. Thus in FIG. 2, when the first, 64-bit, secure application 209 is executing on the secure operating system 226, the register field RW [3:0] has the value "1111", and when the second, 32-bit, secure application 210 is executing the register field RW [3:0] has the value "1110".

It will be appreciated that in other embodiments comprising multiple processors, and hence multiple execution pipelines, and/or processor(s) capable of executing multiple threads concurrently, at any one point multiple program applications can be running, possibly under the control of multiple operating systems, and possibly in a mix of secure and non-secure mode. In such embodiments the control fields of EDIFR can be duplicated to provide the same information, once for each hardware thread.

Figure 3:
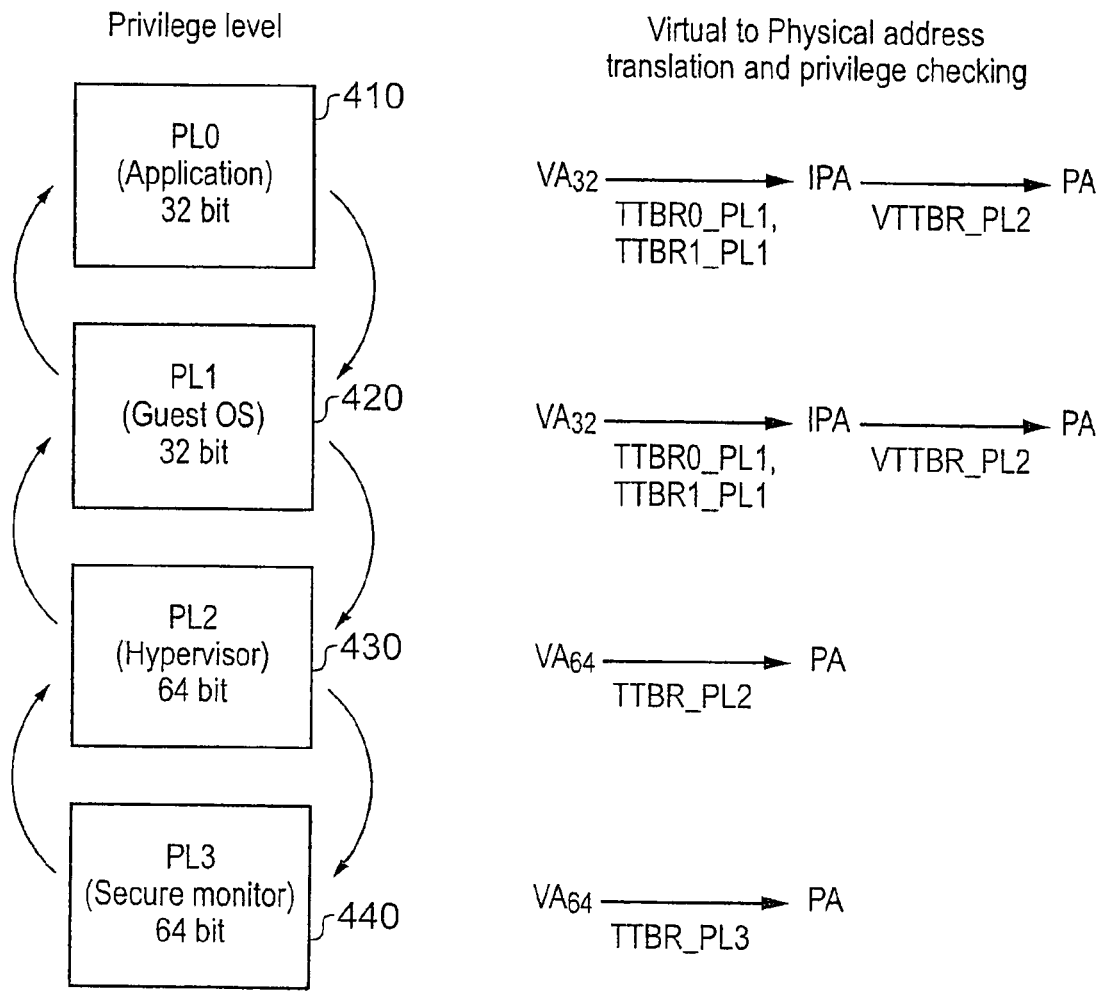
FIG. 3 schematically illustrates four different privilege levels, how switches between the different privilege levels are performed by the data processing apparatus and how different privilege levels implement different schemes for virtual address to physical address translation.

FIG. 3 schematically illustrates how the data processing apparatus of FIG. 1 is configured to have the ability to switch between different ones of the plurality of privilege levels during execution of program instructions and how at different privilege levels the virtual to physical addressed translation scheme can differ.

FIG. 3 shows a 32-bit program application 410 at the lowermost privilege level PL0, a 32-bit guest operating system 420 at the next highest privilege level PL1, a 64-bit hypervisor 430 at the next privilege level PL2 and a 64-bit secure monitor 440 at the highest privilege level PL3. The operating state of the data processing apparatus 100 of FIG. 1 can switch up and down between different ones of the four privilege levels PL0, PL1, PL2, PL3 when the data processing circuitry 100 is executing program instructions either in non-debug mode or in a debug mode. As the data processing apparatus switches between these privilege levels, so the operating state changes.

When the data processing apparatus is executing program instructions from the privilege level PL0, a 32-bit virtual memory address that has been generated by the program code will be translated in to an intermediate physical address using the Translation Table Base Registers (TTBR0_PL1 and TTBR1_PL1) specific to the privilege level to which the guest operating system 420 belongs. The intermediate physical address will in turn be translated into the final physical address using the Virtual Translation Table Base Register (VTTBR_PL2) corresponding to the privilege level PL2 of the hypervisor 430.

Similarly, when executing program instructions of the 32-bit guest operating system 420, a 32-bit virtual address corresponding to the guest operating system instruction being executed will be translated, using translation table base registers TTBR0_PL1 and TTBR1_PL2 corresponding to the privilege level PL1 of the guest operating system 420, into an intermediate physical address and that intermediate physical address will in turn be translated into a final physical address with reference to a Virtual Translation Table Base Register relevant to hypervisor 430.

By way of contrast, when a the program instruction of the 64-bit hypervisor 430 is executed corresponding to the privilege level PL2, only a single stage virtual to physical address translation need be performed so the 64-bit virtual address is directly translated into the physical address with reference to a Translation Table Base Register relevant to the hypervisor privilege level (TTBR_PL2). No Virtual Translation Table Base Register is required in this case.

In addition to the differences between virtual address size and virtual to physical address translations at the different privilege levels of FIG. 3, there is also a difference in accessibility to the system registers and/or memory locations at different privilege levels. In particular, at the highest privilege level all of the system registers will be visible and progressively fewer system registers will be available at progressively lower privilege levels.

In addition, where system control registers are specifically linked to an operating state they may appear as 32-bit system registers when accessed in a 32-bit state but appear as 64-bit registers when accessed in a 64-bit state. For example, a Fault Address Register (FAR) (not shown) contains a virtual address and is 32 bits wide in a 32-bit state but 64 bits wide in a 64-bit state. Other system registers are naturally 64 bits wide and so must be accessed using special system instructions which operate on a pair of the 32-bit general purpose registers when accessed in the 32-bit operating state, but can be accessed with a regular system register instruction operating on a single 64-bit general purpose register when accessed in the 64-bit operating state. For example, the TTBR registers contain the physical base address of a translation table, and since physical addresses are greater than 32 bits in size, are 64 bits wide in both the 32-bit operating state and the 64-bit operating state. Other system registers may be accessible in one state but not the other.

Since the virtual to physical address translation scheme depends upon the operating state of the processor and, in the case FIG. 3, corresponds to the privilege level at which the data processing system is currently operating, it is not possible to arbitrarily allocate a debug instruction set to perform a debug operation at any given privilege level. For example, a problem would be encountered if a 64-bit debug instruction set was allocated when the data processing apparatus was in an operating state corresponding to PL1 of FIG. 3 because the guest operating system 420 operating at this privilege level is a 32-bit guest operating systems which implements a virtual to physical address translation scheme that requires 32-bit virtual addresses to be generated from 64-bit debug instructions. A further problem would be encountered if the 64-bit debug instruction set to read a TTBR register were executed in operating state corresponding to PL1 of FIG. 3 because this instruction normally transfers data between a 64-bit system register and a single 64-bit general purpose register, but the 32-bit instruction set equivalent transfers between a 64-bit system register and a pair of 32-bit general purpose registers.

FIG. 4A schematically illustrates bit-allocation for the EDIFR register 136 of FIG. 1. As shown in the FIG. 4A, the EDIFR is a 32-bit register in which bits EDIFR [9:8] are allocated to designating the current privilege level when the data processing apparatus is in the debug state whilst bits EDIFR [13:10] are allocated as indicating for each of the four privilege levels of the embodiment of FIG. 2, a corresponding operand bit-width associated with that privilege level. The operand bit-width for each privilege level can alternatively be referred to as the register width for the embodiment of FIG. 1, which has a variable register-width (32-bit or 64-bit configurations). Thus the operand bit-width or register-width field of the EDIFR will be denoted RW [13:10] whilst the bits allocated for specifying the current privilege will be denoted PL [9:8]. The operand bit-width indicator bits RW[13:10] are allocated such that bit 13 corresponds to the highest privilege level whilst bit 10 corresponds to the lowest privilege level i.e. bits 13 to 10 respectively correspond to PL3, PL2, PL1 and PL0. The field RW [13:10] is a read-only field whilst the field PL [9:8] is writable by the data processing apparatus to update the current privilege level.

The table of FIG. 4B shows for each of the four possible values of the two-bit field PL [9:8] the corresponding privilege indicated. In particular, PL [9:8]=00 corresponds to lowermost privilege level PL0; PL [9:8]=01 corresponds to PL1; PL [9:8]=10 corresponds to PL2; and PL [9:8]=11 corresponds to uppermost privilege level PL3. As far as the debug circuitry is concerned, these two bits PL [9:8] are read-only. When the data processing apparatus 100 is in the debug mode the two bits PL [9:8] represent the current privilege level of the processor whereas if the data processing apparatus is in a non-debug state, the two bit field PL [9:8] is set to the value "00".

The table of FIG. 4C specifies for different bit-values of the EDIFR field RW [13:10] the corresponding processor register width operating state (or equivalently operand bit-width operating state) for each of the four privilege levels corresponding respectively to the four RW bits. A value of RW [13:10]=1111 corresponds to all four privilege levels being in a 64-bit register width state. A value of RW [13:10]=1110 corresponds to the uppermost three privilege levels PL3, PL2, PL1 being in a 64 bit register width state and the lowermost privilege level PL0 being in a 32-bit register width state. A value of RW [13:10]=1100 corresponds to the uppermost two privilege levels PL3, PL2 being in a 64-bit register width state whist the lowermost two privilege levels PL1, PL0 being in a 32-bit register width state. It should be noted that this particular value, RW [13:10]=1100, will not been seen when the data processing apparatus is currently operating in a secure mode because, as shown in FIG. 2, the hypervisor layer corresponding to PL2 is invisible to the secure mode. A value of RW [13:10]=1000 corresponds to the uppermost privilege level PL3 being in a 64-bit register width state while the remaining lower three privilege levels PL2, PL1, PL0 are in a 32-bit register width state. This particular bit pattern RW [13:10] =1000 has also been chosen to indicate for the secure mode that PL3 is in the 64-bit register width state whilst PL1 and PL0 are in the 32-bit register width state (in this state PL2 is absent). The bit pattern of RW [13:10]=0000 indicates that all four privilege levels correspond to a 32-bit register width state. Other values of RW [13:10] are not permitted.

For this particular embodiment, certain predefined values have been chosen for the register width state indicator RW and the privilege level status indicator PL for convenience. For example if the data processing apparatus is not in a debug mode then the field RW [13:10] is set to "1111". If the current privilege level is anything other than PL0, then the lowermost bit RW [10] of the lower bit register width field is set identically equal to RW [11]. In the secure mode PL2 is not present and hence RW [12] is set identically to RW [11].

Figure 5:
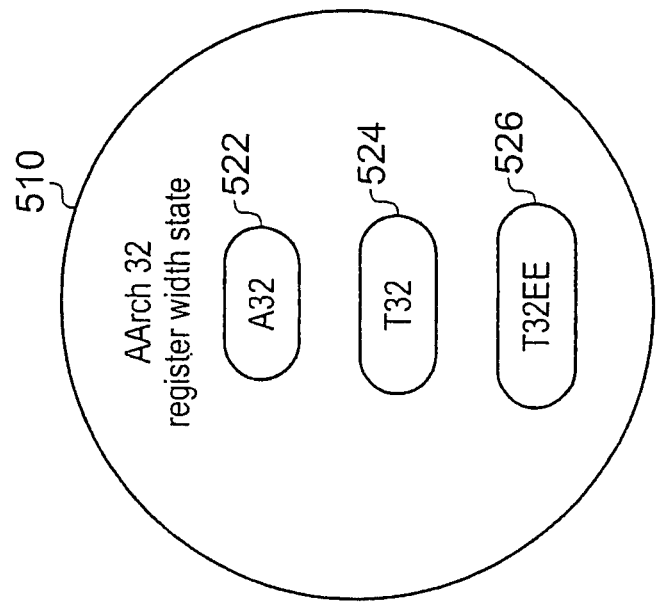
FIG. 5 schematically illustrates a mapping between a processor operating state and the available corresponding instruction sets for both a 32-bit processor operating state and a 64-bit processor operating state.
Figure 5:
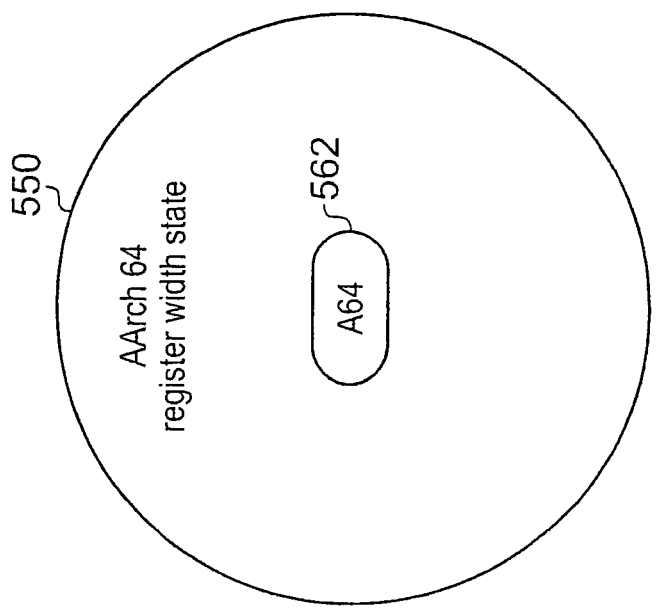

FIG. 5 schematically illustrates, for a 32-bit register width state labelled "AArch 32" and for a 64-bit register width state labelled "AArch 64", the corresponding instruction sets that can be executed when the processor is in the given register width state. In FIG. 5 a first set labelled 510 corresponds to "AArch 32", that is, a 32-bit operand width or 32-bit register width state. In this processor state, the data processing apparatus is capable of executing three different instruction sets. A first instruction set 522 is the "A32" instruction set corresponding to high performance 32-bit wide instructions operating on 32-bit wide data. A second instruction set 524 is the "T32" instruction set which represents a more compact instruction set comprises a subset of the most frequently used A32 instructions compressed into a 16-bit wide format, but these instructions also operate on 32-bit wide data. A third instruction set 526 is the "T32EE" instruction set (also known as the "ThumbEE" instruction set), which represents a compact instruction set similar to T32 but incorporating extensions appropriate for virtual machines providing the capability to perform conversion between object-oriented program code such as Java instructions and T32EE instructions. Thus there are three options for instruction sets that can be executed when the processor is operating according in a 32-bit register width state (i.e. operating on 32-bit wide data): A32, T32 and T32EE.

In FIG. 5, a second set 550 represents a 64-bit register width state "AArch 64", in which a single "A64" instruction set 562 can be executed. The A64 instruction set operates on 64-bit wide data. Notably, in this embodiment, there is no intersection between the set of AArch 64 instruction sets 550 and the set of AArch 32 instruction sets 510. According to the present technique, if it is determined that the data processing apparatus 100 is currently in the AArch 64 register width state 550 then the A64 instruction set 562 is allocated as the debug instruction set whereas if the processor is in the AArch 32 register width state upon entry to the debug mode then the T32 instruction set 524 is selected as the debug instruction set regardless of whether the processor was executing the A32 instruction set 522, the T32 instruction set 524 or the T32EE instruction set 526 upon entry to the debug mode. Clearly, the particular choice of the T32 instruction set 524 for the 32-bit register width state AArch 32 is specific to this particular embodiment. In alternative embodiments, any one of the three possible AArch 32 instruction sets 522, 524, 526 could be selected as the debug instruction set. In further alternative embodiments, a subset of one of the full non-debug mode instruction sets is selected as the debug mode instruction set.

Figure 6:
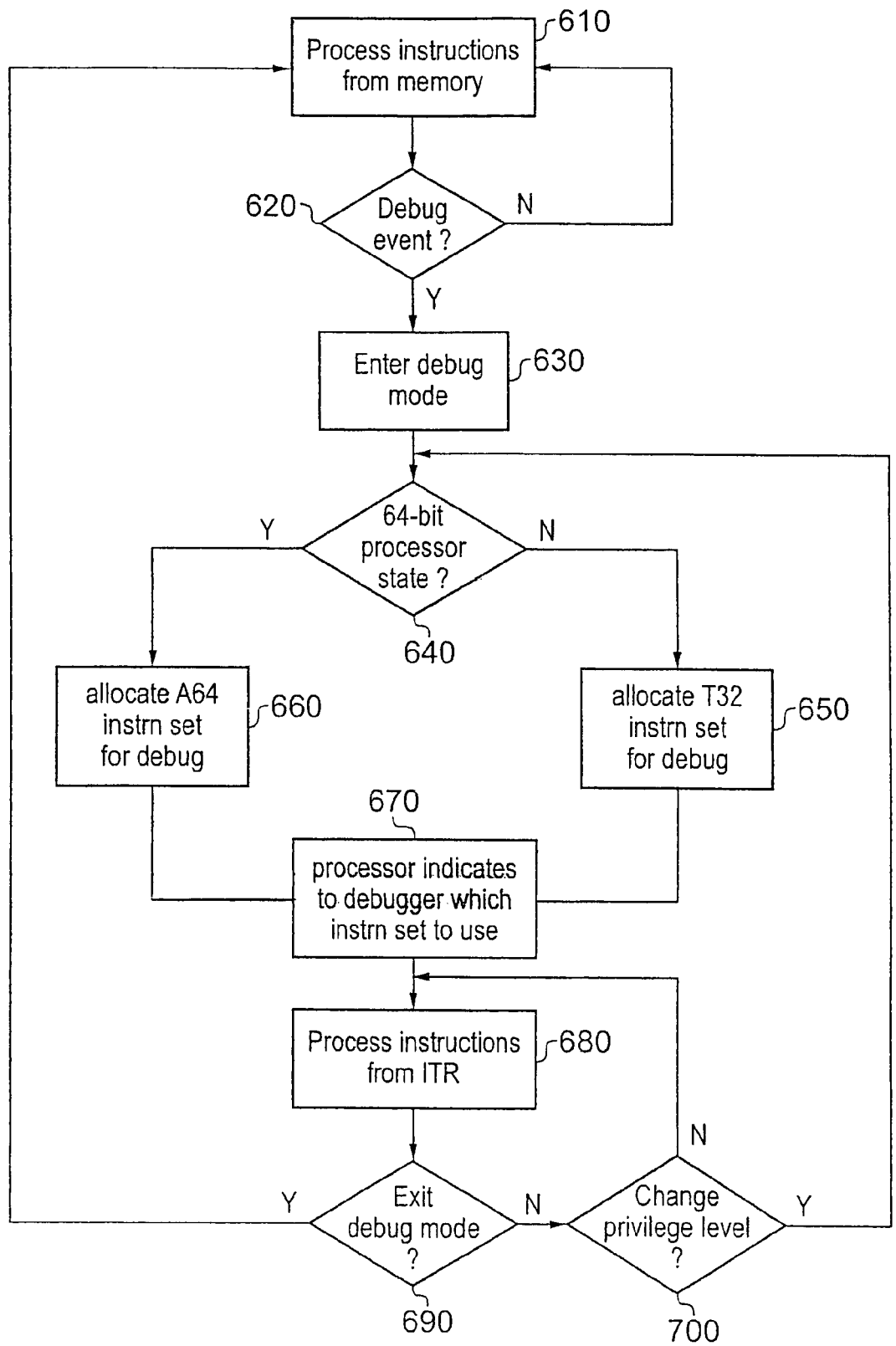
FIG. 6 is a flow chart that schematically illustrates how an appropriate debug instruction set is allocated by the data processing apparatus of FIG. 1.

FIG. 6 is a flow chart that schematically illustrates operations performed by the data processing apparatus of FIG. 1 in order to determine an appropriate debug instruction set for implementation by the debugging module 130.

The process begins at stage 610 where the execution pipeline 110 is processing instructions obtained from either the on-chip memory 142 or the off-chip memory 144. Thus, at stage 610 the data processing apparatus is executing instructions in a standard operating mode rather than a debug mode. The process then proceeds to stage 620, where it is determined whether or not a debug event has occurred. If no debug event has occurred at stage 620 then the processor returns to stage 610 where the execution pipeline continues to fetch, decode and execute instructions from the memory 142, 144. However, if a debug event has in fact been detected at stage 620 then the process proceeds to stage 630, whereupon the data processing apparatus (data processing circuitry) enters debug mode. After stage 630, the process proceeds to stage 640, where it is determined whether or not the data processing apparatus is in a 64-bit processor state. If the data processing apparatus is found to be in a 32-bit processor state at stage 640 then the process proceeds to stage 650 where the data processing circuitry allocates the T32 instruction set as the debug instruction set. The process then proceeds to stage 670. On the other hand, if it is determined at stage 640 that the data processing apparatus is in a 64-bit processor state corresponding to the state 550 FIG. 5, then the process proceeds to stage 660 where the data processing circuitry allocates the A64 instruction set for the purpose of the debug operations. As shown in FIG. 5, the A64 instruction set is an instruction set that the data processing circuitry can execute in a 64-bit processor operating state whilst the T32 instruction set is one of three different instruction sets that the data processing apparatus can execute in a 32-bit processor operating state in a non-debug mode.

Although in the embodiment of FIG. 6, either the A64 or the T32 instruction set is allocated by the processor at stages 650 and 660, in alternative embodiments, the allocated debug instruction set comprises a subset of the full instruction set. For example, a subset of one of the A64 instruction set, the A32 instruction set, the T32 instruction set or the T32EE instruction set. A subset of a full instruction set suitable for use in the debug mode may for example be appropriately chosen to preclude execution of instructions such as branch instructions, which are undesirable in a debug mode. Thus in a subset of the T32 or A64 instruction set, branch instructions etc. could be forced to be undefined.

Subsequent to both stage 650 and 660, the process proceeds to stage 670 where the debug circuitry 130 indicates to the debugger 152 (i.e. the debugger unit) which instruction set to use. At this stage the data processing circuitry also updates registers in the debug module 130 to indicate which instruction set is currently in use. Once the appropriate debug instruction set is indicated at stage 670, the process proceeds to stage 680 where execution of debug instructions begins. At this stage, since the processor is in the debug mode, the execution pipeline 110 no longer fetches instruction from the memory, but instead fetches instructions directly from the instruction transfer register 134 of the debug module 130 FIG. 1.

After stage 680, the process proceeds to stage 690, where it is determined whether or not the data processing apparatus should exit the debug mode. The debug mode will be exited at stage 690 if the debug operations being controlled by the debugger software 152 are complete and if so, the process returns to stage 610 where the processor switches out of the debug mode back into the standard operational mode whereupon instructions are fed to the execution pipeline 110 from the memory 142, 144. On the other hand, if at stage 690 it is determined that further debug operations are required and the data processing apparatus should remain in the debug mode, then the process proceeds to 700 where it is established whether or not there has been a change to the current privilege at which the data processor is operating whilst in the debug mode.

If there has been no change to the privilege level since the most recently established privilege level then the process returns to stage 680. Thus if there is no change to the current privilege level and the data processing apparatus is still in the debug state then instructions from the instruction transfer register 134 continue to be processed. However, whenever there is a change to the privilege level at stage 700, the process returns to stage 640 where the allocated debug instruction set is updated according to the current privilege level.

Figure 7:
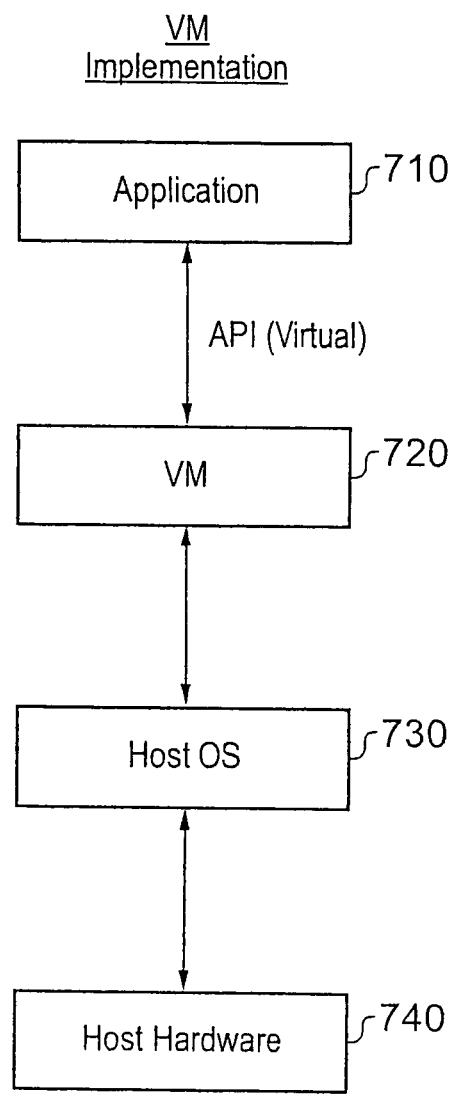
FIG. 7 schematically illustrates a virtual machine implementation.

FIG. 7 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 740 running a host operating system 730 supporting a virtual machine program 720. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 720 provides an application program interface to an application program 710 which is the same as the application program interface which would be provided by the real hardware which is the device being modeled by the virtual machine program 720. Thus, the program instructions, including the control of memory accesses described above, may be executed from within the application program 710 using the virtual machine program 720 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   data processing circuitry for performing data processing operations in response to execution of program instructions, said data processing circuitry being configured to operate in at least an operational mode and a debug mode;
   debug circuitry configured to provide an interface between said data processing circuitry and a debugger unit external to said data processing circuitry, said debug circuitry being configured to control operation of said data processing circuitry using debug instructions of a debug instruction set when said data processing circuitry is operating in said debug mode;
   wherein said data processing circuitry has a plurality of operating states including a first operating state and a second operating state, wherein in said first operating state the data processing circuitry uses virtual addresses having a greater number of bits than virtual addresses used in said second operating state, and in said first operating state said data processing circuitry is configured to execute instructions from a first instruction set, and in said second operating state said data processing circuitry is configured to support execution of instructions from a second instruction set and a third instruction set; and
   wherein said data processing circuitry is configured to determine, upon entry of said data processing circuitry into said debug mode, a current operating state of said data processing apparatus and to allocate said debug instruction set depending upon said current operating state, wherein said data processing circuitry is configured to allocate said first instruction set as said debug instruction set if said current operating state is said first operating state, and to allocate said second instruction set as said debug instruction set if said current operating state is said second operating state regardless of whether said data processing circuitry executed instructions from said second instruction set or said third instruction set prior to said entry into said debug mode.

2. Data processing apparatus according to claim 1, wherein said data processing circuitry is configured to indicate to said debugger unit said allocated debug instruction set to be used to control said data processing circuitry.

3. Data processing apparatus according to claim 1, wherein said data processing circuitry is configurable to operate at a plurality of privilege levels, wherein at different privilege levels, said data processing circuitry imposes on program instructions different access permissions to at least one of a memory and a set of registers.

4. Data processing apparatus according to claim 3, wherein at different ones of said privilege levels, said data processing circuitry applies respectively different virtual memory address to physical memory address translation rules.

5. Data processing apparatus according to claim 3, wherein said data processing apparatus is configured to execute program instructions corresponding to a plurality of different software hierarchical levels corresponding to a respective plurality of said privilege levels.

6. Data processing apparatus according to claim 5, wherein a first of said plurality of privilege levels corresponds to an application layer and a second of said plurality of privilege levels corresponds to an operating system layer.

7. Data processing apparatus according to claim 6, wherein a third of said plurality of privilege levels corresponds to a hypervisor layer.

8. Data processing apparatus according to claim 6, wherein a further privilege level corresponds to a security-monitoring layer.

9. Data processing apparatus according to claim 3, wherein upon switching between different ones of said plurality of privilege levels, said data processing circuitry is configured to repeat said determination of said current operating state and said debug instruction set to generate an updated debug instruction set and to indicate said updated debug instruction set to said debugger unit.

10. Data processing apparatus according to claim 1, wherein said current operating state is selected from a plurality of different processor operating states having respective different operand bit-widths.

11. Data processing apparatus according to claim 10, wherein said plurality of operating states comprise at least a 32-bit operating state and a 64-bit operating state.

12. Data processing apparatus according to claim 10, wherein said data processing apparatus comprises a plurality of registers for storing operands of said program instructions and wherein said different operand bit-widths correspond to different register widths used by said data processing circuitry.

13. Data processing apparatus as claimed in claim 12, wherein at least a subset of said plurality of registers are configured as variable-width registers.

14. Data processing apparatus according to claim 2, wherein said data processing circuitry is configured to indicate said debug instruction set to said debugger unit by writing to at least one register accessible to said debugger unit.

15. Data processing apparatus according to claim 2, wherein said data processing circuitry is configured to indicate said debug instruction set to said debugger unit by sending a control command to said debugger unit.

16. Data processing apparatus according to claim 1, wherein said data processing apparatus is configured to maintain a stored value of said current operating state in a given location accessible to said debugger unit.

17. Data processing apparatus according to claim 3, wherein said current operating state is selected from a plurality of processor operating states having respective operand bit-widths and wherein data processing apparatus is configured to maintain a record of an operand bit-width associated with each of said plurality of privilege levels in a first location accessible to said debugger unit.

18. Data processing apparatus according to claim 17, wherein said data processing apparatus is configured to maintain a record of a current privilege level at which said data processing circuitry is operating in a second location accessible to said debugger unit.

19. Data processing apparatus as claimed in claim 18, wherein said data processing circuitry uses said current privilege level to determine from said plurality of processor operating states having said respective operand bit-widths said debug instruction set.

20. Data processing apparatus according to claim 1, wherein said data processing apparatus is configured to maintain a record of a current operand bit-width corresponding to said current processor operating state.

21. Data processing apparatus according to claim 20, wherein said debugger unit is configured to deduce said debug instruction set allocated by said data processing circuitry from said record of said current operand bit width.

22. Data processing apparatus according to claim 21, wherein said debugger unit is configured to cause at least one program instruction to be executed by said data processing circuitry to determine a current privilege level at which said data processing circuitry is operating.

23. Data processing apparatus as claimed in claim 1, wherein said allocated debug instruction set comprises a subset of a full instruction set available for execution by said data processing apparatus in a non-debug mode.

24. Data processing apparatus as claimed in claim 23, wherein said subset of said full instruction set excludes at least branch instructions.

25. A non-transitory computer readable storage medium storing a virtual machine provided by a computer program which, when executed by a data processing apparatus, provides an instruction execution environment according to the data processing apparatus as claimed in claim 1.

26. A debug unit for performing debugging of operations of a data processing apparatus comprising processing circuitry, said data processing apparatus being capable of operating at least in a debug mode and an operational mode and in a plurality of different operating states, said debug unit comprising:
reading circuitry for reading from a storage location within said data processing apparatus, a record of a current operating state specifying one of said plurality of operating states of said data processing apparatus, wherein said plurality of different operating states include a first operating state and a second operating state, and in said first operating state said data processing apparatus supports virtual addresses having a greater number of bits than virtual addresses supported in said second operating state, and in said first operating state said data processing apparatus supports execution of instructions from a first instruction set, and in said second operating state said data processing apparatus is configured to support execution of instructions from a second instruction set and a third instruction set; and
deducing circuitry for deducing, depending upon the current operating state, a debug instruction set for use in generating debug instructions for supply to debug circuitry of said data processing apparatus to control operation of said processing circuitry for performing said debugging, wherein said deducing circuitry is configured to deduce that said first instruction set is said debug instruction set if said current operating state is said first operating state, and to deduce that said second instruction set is said debug instruction set if said current operating state is said second operating state regardless of whether said data processing apparatus executed instructions from said second instruction set or said third instruction set prior to said entry into said debug mode.

27. A debug unit as claimed in claim 26, wherein said deducing circuitry is configured to deduce said debug instruction set based on said read contents of said current operand bit-width record within said data processing apparatus.

28. A debug unit as claimed in claim 27, wherein said data processing apparatus is capable of operating at a plurality of different privilege levels, wherein at different privilege levels, said data processing apparatus imposes on program instructions different access permissions to at least one of memory and a set of registers and wherein said deducing circuitry is configured to cause at least one program instruction to be executed by said data processing apparatus to determine a current privilege level at which said data processing apparatus is operating.

29. A debug method for performing debugging of operations of a data processing apparatus comprising data processing circuitry, said data processing apparatus being capable of operating at least in a debug mode and an operational mode and in a plurality of different operating states, said debug method comprising:
reading from a storage location within said data processing apparatus, a record of a current operating state specifying one of said plurality of operating states of said data processing apparatus, wherein said plurality of different operating states include a first operating state and a second operating state, and in said first operating state said data processing apparatus uses virtual addresses having a greater number of bits than virtual addresses used in said second operating state, and in said first operating state said data processing apparatus supports execution of instructions from a first instruction set, and in said second operating state said data processing apparatus is configured to support execution of instructions from a second instruction set and a third instruction set; and
deducing, depending upon the current operating state, a debug instruction set for use in generating debug instructions for supply to debug circuitry of said data processing apparatus to control operation of said data processing circuitry for performing said debugging, wherein said first instruction set is deduced to be said debug instruction set if said current operating state is said first operating state, and said second instruction set is deduced to be said debug instruction set if said current operating state is said second operating state regardless of whether said data processing apparatus executed instructions from said second instruction set or said third instruction set prior to said entry into said debug mode.

30. A non-transitory computer readable storage medium storing a computer program which, when implemented on a data processing apparatus, implements the debug method of claim 29.

31. A data processing apparatus comprising:
means for performing data processing operations in response to execution of program instructions, said means for performing data processing operations being configured to operate in at least an operational mode and a debug mode;
means for debugging configured to provide an interface between said means for performing data processing and a means for debug analysis external to said data processing apparatus, said means for debugging being configured to control operation of said means for performing data processing using debug instructions of a debug instruction set when said means for performing data processing is operating in said debug mode;
wherein said means for performing data processing operations has a plurality of operating states including a first operating state and a second operating state, wherein in said first operating state the means for performing data processing operations uses virtual addresses having a greater number of bits than virtual addresses used in said second operating state, and in said first operating state said means for performing data processing operations is configured to execute instructions from a first instruction set, and in said second operating state said means for performing data processing operations is configured to support execution of instructions from a second instruction set and a third instruction set; and
wherein said means for performing data processing is configured to determine, upon entry of said means for performing data processing into said debug mode, a current operating state of said means for performing data processing and to allocate said debug instruction set depending upon said current operating state; and
wherein said means for performing data processing is configured to allocate said first instruction set as said debug instruction set if said current operating state is said first operating state, and to allocate said second instruction set as said debug instruction set if said current operating state is said second operating state regardless of whether said means for performing data processing operations executed instructions from said second instruction set or said third instruction set prior to said entry into said debug mode.

32. A data processing method comprising:
performing data processing operations in response to execution of program instructions on data processing circuitry being configured to operate in at least an operational mode and a debug mode, wherein said data processing circuitry has a plurality of operating states including a first operating state and a second operating state, wherein in said first operating state the data processing circuitry uses virtual addresses having a greater number of bits than virtual addresses used in said second operating state, and in said first operating state said data processing circuitry is configured to execute instructions from a first instruction set, and in said second operating state said data processing circuitry is configured to support execution of instructions from a second instruction set and a third instruction set;
providing a debug interface between said data processing circuitry and a debugger unit external to said data processing circuitry, said debug interface being configured to control operation of said data processing circuitry using debug instructions of a debug instruction set when said data processing circuitry is operating in said debug mode;
determining, upon entry of said data processing circuitry into said debug mode, a current operating state of said data processing circuitry and allocating said debug instruction set, depending upon said current operating state,
wherein said first instruction set is allocated as said debug instruction set if said current operating state is said first operating state, and said second instruction set is allocated as said debug instruction set if said current operating state is said second operating state regardless of whether said data processing circuitry executed instructions from said second instruction set or said third instruction set prior to said entry into said debug mode.

33. A computer program product comprising a non-transitory computer readable storage medium storing a computer program, said program, when implemented on a data processing apparatus, implements the method of claim 32.

34. Apparatus for performing debugging of operations of a data processing apparatus comprising data processing circuitry, said data processing apparatus being capable of operating at least in a debug mode and an operational mode and in a plurality of different operating states, said apparatus comprising:
means for reading from a storage location within said data processing apparatus, a record of a current operating state specifying one of said plurality of operating states of said data processing apparatus, wherein said plurality of different operating states include a first operating state and a second operating state, and in said first operating state said data processing apparatus uses virtual addresses having a greater number of bits than virtual addresses used in said second operating state, and in said first operating state said data processing apparatus supports execution of instructions from a first instruction set, and in said second operating state said data processing apparatus is configured to support execution of instructions from a second instruction set and a third instruction set; and
means for deducing, depending upon the current operating state, a debug instruction set for use in generating debug instructions for supply to debug circuitry of said data processing apparatus to control operation of said data processing circuitry for performing said debugging, wherein said means for deducing is configured to deduce that said first instruction set is said debug instruction set if said current operating state is said first operating state, and to deduce that said second instruction set is said debug instruction set if said current operating state is said second operating state regardless of whether said data processing apparatus executed instructions from said second instruction set or said third instruction set prior to said entry into said debug mode.

* * * * *